United States Patent [19]
Inagaki

[11] Patent Number: 5,999,214
[45] Date of Patent: Dec. 7, 1999

[54] IMAGE PICKUP SYSTEM AND COMMUNICATION SYSTEM FOR USE IN VIDEO CONFERENCE OR THE LIKE

[75] Inventor: Atsushi Inagaki, Yokohama, Japan

[73] Assignee: Canon Kabushiki Kaisha, Tokyo, Japan

[21] Appl. No.: 09/010,686

[22] Filed: Jan. 22, 1998

Related U.S. Application Data

[62] Division of application No. 08/892,464, Jul. 14, 1997, Pat. No. 5,742,329, which is a continuation of application No. 08/456,284, May 31, 1995, abandoned, which is a continuation of application No. 08/140,604, Oct. 21, 1993, abandoned.

[30] Foreign Application Priority Data

Dec. 25, 1992 [JP] Japan .................................... 4-345682
Dec. 26, 1992 [JP] Japan .................................... 4-287619

[51] Int. Cl.$^6$ .................................................... H04N 5/232
[52] U.S. Cl. .............................. 348/211; 348/15; 348/16
[58] Field of Search .................................. 348/13, 14, 15, 348/221, 212, 213, 239, 143, 169, 16; 345/112, 173, 180; H04N 5/225

[56] References Cited

U.S. PATENT DOCUMENTS

| | | |
|---|---|---|
| 4,028,725 | 6/1977 | Lewis . |
| 4,945,367 | 7/1990 | Blackshear . |
| 4,965,819 | 10/1990 | Kannes . |
| 4,980,761 | 12/1990 | Natori . |
| 5,027,198 | 6/1991 | Yoshioka .................................... 348/15 |
| 5,049,988 | 9/1991 | Sefton . |
| 5,206,721 | 4/1993 | Ashida et al. ............................ 348/15 |
| 5,257,306 | 10/1993 | Watsnabe . |
| 5,307,173 | 4/1994 | Yuen et al. .............................. 348/734 |
| 5,335,011 | 8/1994 | Addeo . |
| 5,742,329 | 4/1998 | Masunaga et al. ........................ 348/15 |

*Primary Examiner*—Tuan Ho
*Attorney, Agent, or Firm*—Morgan & Finnegan LLP

[57] ABSTRACT

A video conference system includes a video camera for imaging participants in a conference, a plotting image input unit for receiving plotting data from a participant, and a synthesization unit for synthesizing an image including plotting image data being input and video data of the participant who is entering the plotting image data.

5 Claims, 17 Drawing Sheets

IMAGE PICKUP SYSTEM AND COMMUNICATION SYSTEM FOR USE IN VIDEO CONFERENCE OR THE LIKE

This is a division of prior application Ser. No. 08/892,464, filed Jul. 14, 1997, U.S. Pat. No. 5,742,329 which is a Continuation of abandoned application Ser. No. 08/456,284 filed May 31, 1995, which is a Continuation of abandoned application Ser. No. 08/140,604, filed on Oct. 21, 1993, each of which are herein incorporated by reference.

BACKGROUND OF THE INVENTION

1. Field of the Invention

The present invention relates to an image pickup system and a communication system for use in, e.g., a video conference system for communicating at least image data and voice data between remote places.

2. Related Background Art

FIGS. 1A to 1C are schematic views showing a conventionally known video conference system. FIGS. 1A, 1B, and 1C illustrate the first, the second, and the third states, respectively. Referring to FIGS. 1A to 1C, a plurality of participants or attendants in a conference, for example, four persons A to D in a distant place are generally denoted by reference numeral 1. A television (TV) camera 2 for imaging the attendants 1 at the conference is placed on a panhead (not shown) for panning the TV camera 2. A camera control device 5 is so arranged as to freely change the panning position of the TV camera 2. A moving image codec 3 codes a video signal obtained by the TV camera 2. A communication control unit 4 supplies the coded video signal from the moving image codec 3 and other control information to a local line 6. A communication control unit 7 receives the coded video signal and the other control information from the local line 6. A moving image codec 10 decodes the coded video signal received by the communication control unit 7 and supplies the decoded video signal to a TV monitor 12. Each participant in the conference is displayed as a FIG. 13 on the TV monitor 12.

A camera operation unit 8 supplies a control signal to the camera control device 5 via the communication control unit 7, the local line 6, and the communication control unit 4, thereby panning the TV camera 2.

Of the above components, the TV camera 2, the moving image codec 3, the communication control unit 4, and the camera control device 5 are arranged in a remote place, and the communication control unit 7, the moving image codec 10, the TV monitor 12, and the camera operation unit 8 are arranged in a self-station which communicates with the distant place through the local line 6. In FIGS. 1A to 1C, for the sake of simplicity in explanation, only parts for imaging the attendants 1 are illustrated on the remote place side, and only parts for displaying the image are illustrated on the self-station side. The system, however, of course includes a voice system, a data system, and various operation systems in addition to the above components.

The operation of the above arrangement will be described below.

Assume, as shown in FIG. 1A, that the person B of the attendants 1 at the conference is imaged at the center of the screen by the TV camera 2. In this case, the image of the person B obtained by the TV camera 2 is coded by the moving image codec 3 and transmitted from the communication control unit 4 to the self-station through the local line 6. Upon receiving the image from the local line 6 via the communication control unit 7, the self-station decodes the received image into the video signal by using the moving image codec 10 and displays the video signal as the FIG. 13 on the TV monitor 12.

When the speaker among the attendants 1 is switched to the person D, the camera operation unit 8 in the self-station is manipulated to transmit a control signal to the camera control device 5, thereby panning the TV camera 2 via a panning means (not shown). Consequently, as shown in FIG. 1B, the person D of the attendants 1 at the conference is imaged at the center of the screen by the TV camera 2. In this case, the image of the person D obtained by the TV camera 2 is transmitted to the self-station via the moving image codec 3, the communication control unit 4, and the local line 6. In the self-station, the video signal is obtained from the local line 6 via the communication control unit 7 and the moving image codec 10 and displayed as the FIG. 13 on the TV monitor 12.

When the speaker among the attendants 1 at the conference is switched to the person A, the camera operation unit 8 in the self-station is manipulated to transmit a control signal to the camera control device 5, thereby panning the TV camera 2. As a result, as shown in FIG. 1C, the person A of the attendants 1 is imaged at the center of the screen by the TV camera 2. In this case, the image of the person A obtained by the TV camera 2 is transmitted to the self-station via the moving image codec 3, the communication control unit 4, and the local line 6. In the self-station, the video signal is obtained from the local line 6 via the communication control unit 7 and the moving image codec 10 and displayed as the FIG. 13 on the TV monitor 12.

As described above, the camera operation unit 8 of the self-station is manipulated to pan the TV camera 2 via the camera control device 5, and so an image in which a speaking one of the attendants 1 at the conference is imaged at the center of the screen can be displayed on the TV monitor 12. Therefore, a speaking one of the attendants 1 in the distant place can be selectively monitored as the FIG. 13 displayed on the TV monitor 12 in the self-station.

The conventional video conference system with the arrangement as described above has the following problems.

That is, various control operations, such as control performed by the operation means in the remote place and control performed by the operation means in the self-station are used to determine the panning position of the TV camera 2, i.e., pan the TV camera 2 toward a particular one of the attendants 1 at the conference in the distant place. If, however, the TV camera 2 is panned to perform switching between persons to be imaged among the attendants 1, this merely results in a change in the FIG. 13 displayed on the TV monitor 12 in the self-station. Therefore, it is difficult for participants in the conference in the self-station to accurately recognize the positional relationship between the attendants 1 in the remote place.

That is, although the attendants 1 at the conference in the distant place are actually seated side by side at different positions, they are displayed at the fixed position of the TV monitor 12 in the self-station. This impairs the ambience of the conference and also causes an inconvenience that the TV camera 2 may be operated in an opposite direction in searching for a specific person by changing the panning position of the TV camera 2 from the self-station.

To eliminate the above inconveniences, there is provided a method of displaying all of the attendants 1 at the conference constantly by using a plurality of TV cameras 2 and a plurality of TV monitors 12 in the self-station. Since, however, this largely increases the quantity of information to be transmitted, the method is impractical when the number of local lines 6 and the installation cost are taken into account.

Although not shown in FIGS. 1A to 1C, the above video conference system further includes a camera for imaging originals, a still image monitor for displaying the images obtained by that camera, and a plotting image input device (e.g., a digitizer) for inputting plotting images.

Each of these devices is used to perform, e.g., writing on a common material image to point out a particular portion.

More specifically, the same material image is displayed on the still image display monitors of terminals of individual participants in a conference, and each participant can perform writing in a given portion of the material image by using the plotting image input device of his or her terminal. This writing is superimposed on the material image displayed on the still image display monitors of all the participants in the conference.

In the conventional video conference system with this arrangement, a participant currently writing data is clearly known if a video conference is held between two stations. If, however, three or more stations are attending at a conference, it is impossible to determine a person currently writing data.

SUMMARY OF THE INVENTION

In view of the above-described background of the invention, the objective of the present invention is to provide a video conference system which is economical and can exactly determine relationship between positions of participants and also exactly determine the participant who is currently inputting information. And also, the other objective of the present invention is to provide an image pickup system used in the video conference system of the present invention.

According to one preferred embodiment of the present invention, there is disclosed an image pickup system comprising image pickup means for imaging objects to be imaged, registering means for determining imaging directions of said image pickup means in advance, memory means capable of storing a plurality of images corresponding to the individual imaging directions set by said registering means, and synthesizing means for synthesizing the stored images read out from said memory means into an image currently being obtained by said image pickup means in correspondence with the individual imaging directions registered in said registering means.

According to another preferred embodiment of the present invention, there is disclosed a video conference system comprising a video camera for imaging participants in a conference, plotting image input means, determining means for determining a participant in a conference inputting a plotting image by using said plotting image input means, and synthesizing means for synthesizing a predetermined image, which indicates input of the plotting image, into image data obtained by said video camera and representing the participant in a conference performing the plotting image input, on the basis of the determination result of said determining means.

Other objects and advantages of the invention will become apparent from the following detailed description taken in conjunction with the appended claims.

DETAILED DESCRIPTION OF THE PREFERRED EMBODIMENTS

One embodiment of a video conference system according to the present invention will be described below with reference to the accompanying drawings.

1st Embodiment

Figure 1A:
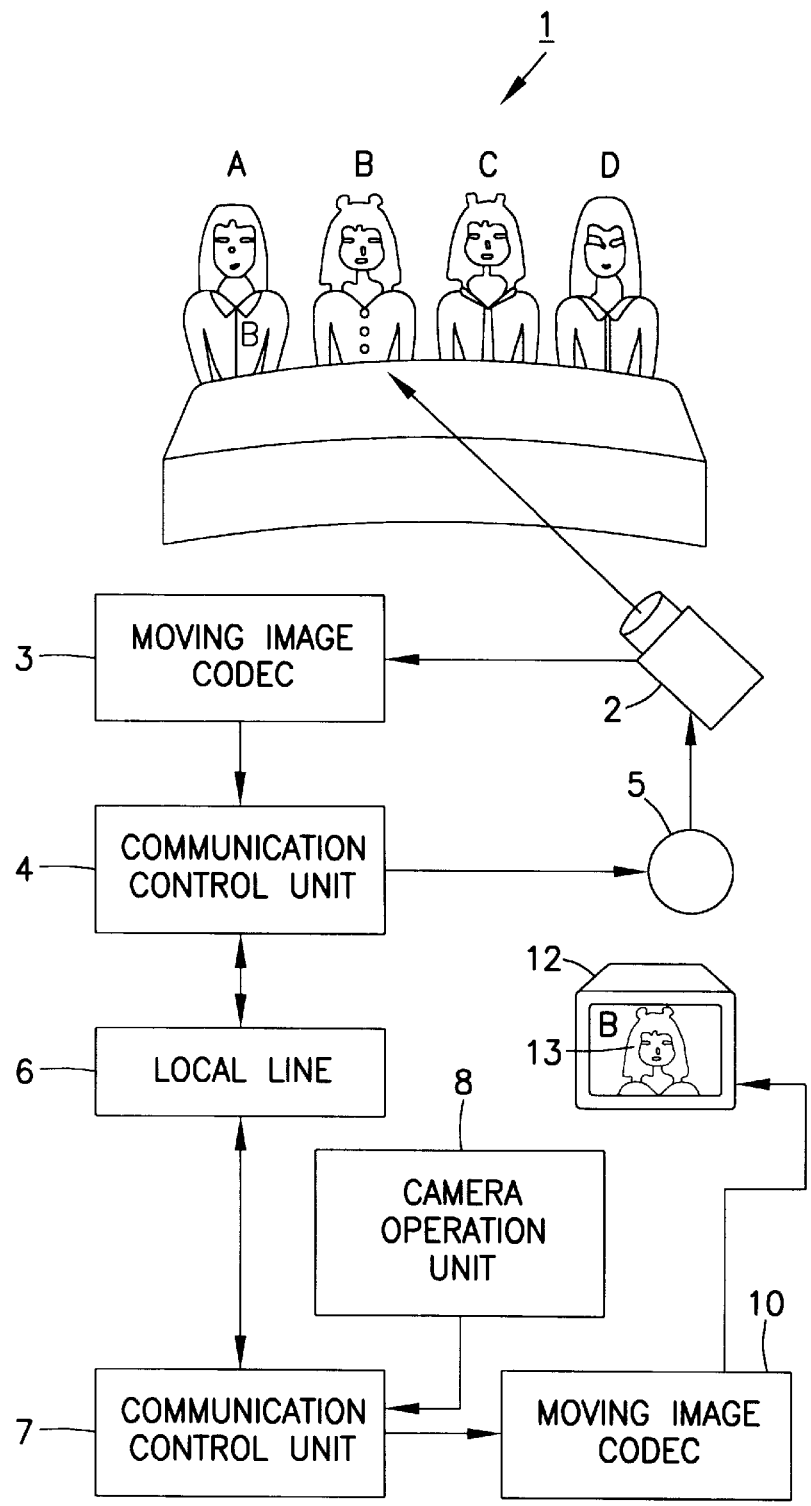
FIGS. 1A to 1C are views showing the arrangement of a conventional video conference system.
Figure 1B:
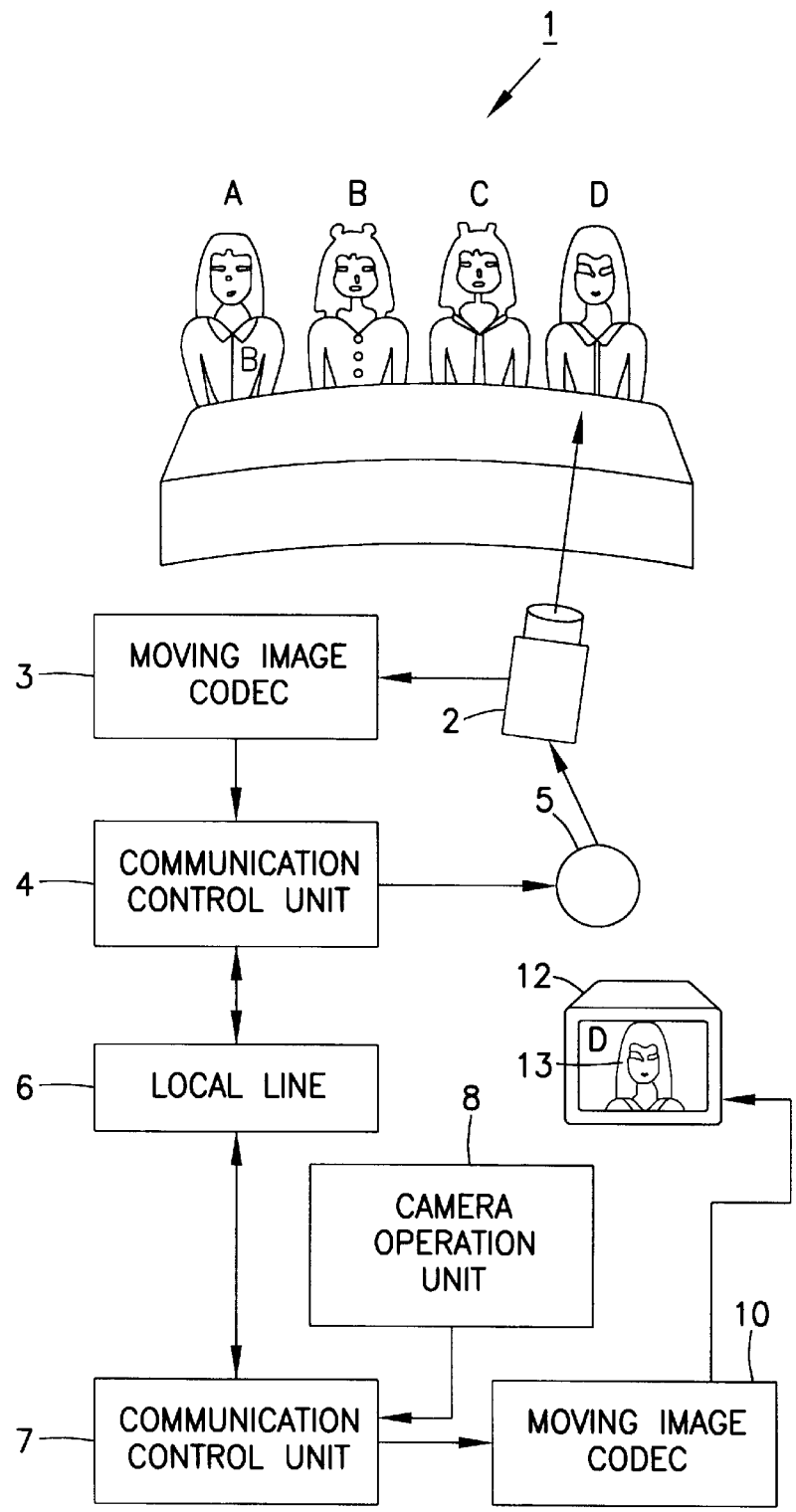
Figure 1C:
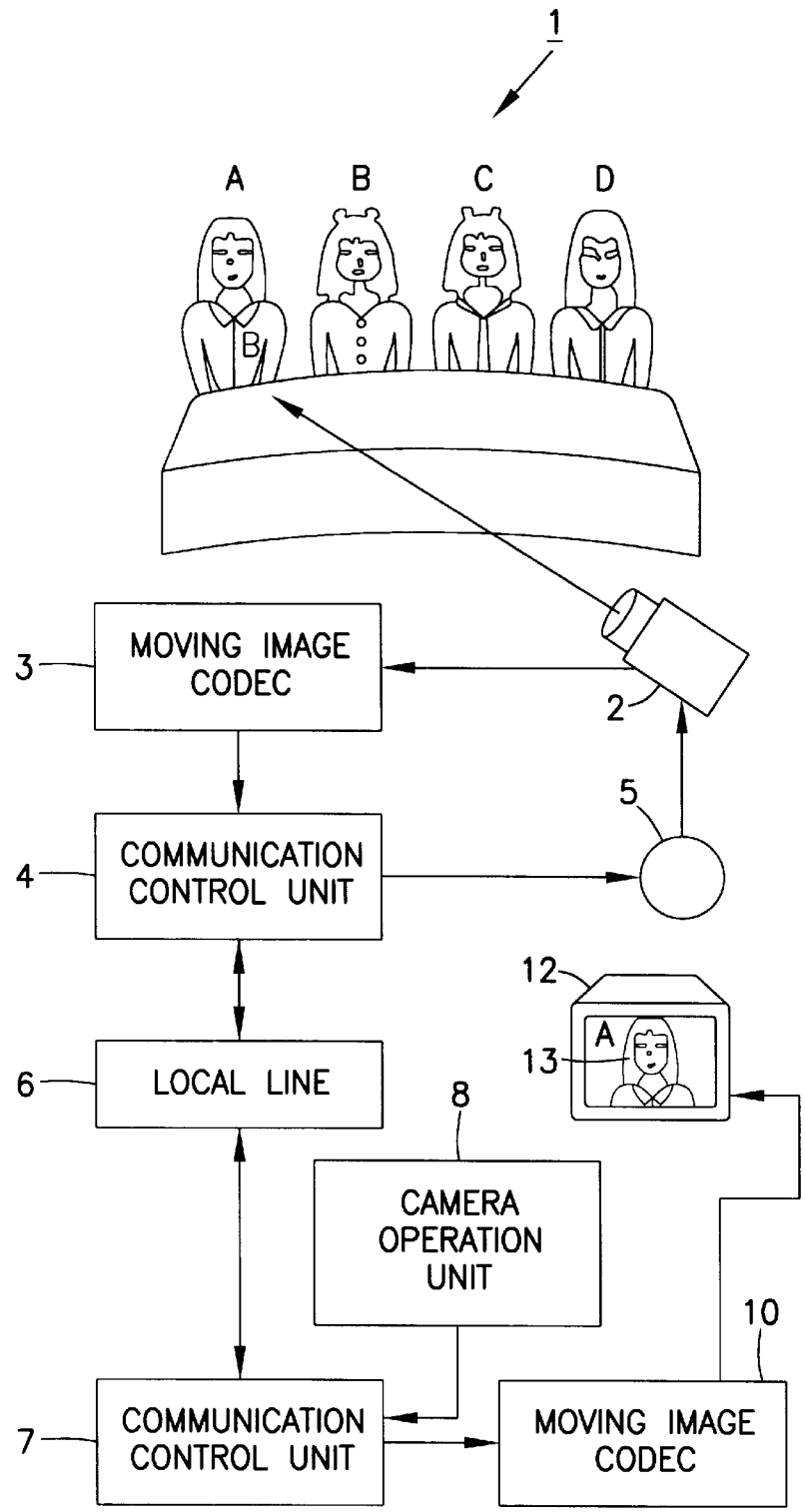
Figure 2:
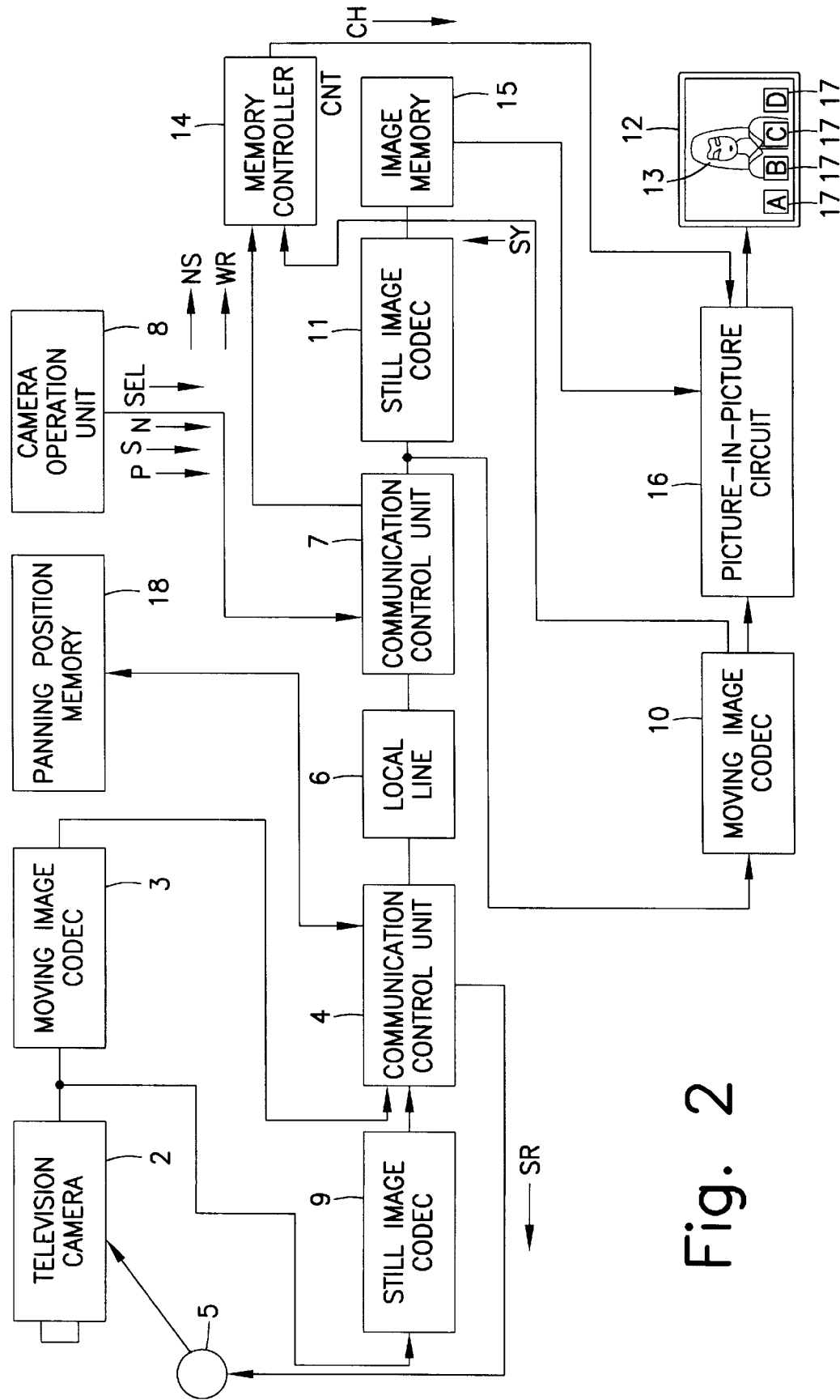
FIG. 2 is a block diagram showing the arrangement of a video conference system according to the first embodiment of the present invention.

FIG. 2 is a block diagram showing the arrangement of a video conference system according to the first embodiment of the present invention. Note that the same reference numerals as in FIGS. 1A to 1C denote the same parts in FIG. 2, and a detailed description thereof will be omitted. Referring to FIG. 2, a still image codec 9 in a remote place codes an image from a television (TV) camera 2 as a still image and transmits the coded image to a local line 6 via a communication control unit 4. A still image codec 11 in a self-station decodes the coded video signal received by a communication control unit 7 from the local line 6 and outputs the decoded signal as a still image video signal. An image memory 15 stores a plurality of images of the still image video signal from the still image codec 11. A memory controller 14 controls the image memory 15 and supplies various sync signals. A picture-in-picture circuit 16 synthesizes a plurality of video signals from the image memory 15 into a moving image video signal received by the communication control unit 7 from the local line 6, thereby outputting a display video signal. A panning position memory 18 is provided in association with the communication control unit 4 and stores a plurality of panning positions of the TV camera 2.

Figure 13:
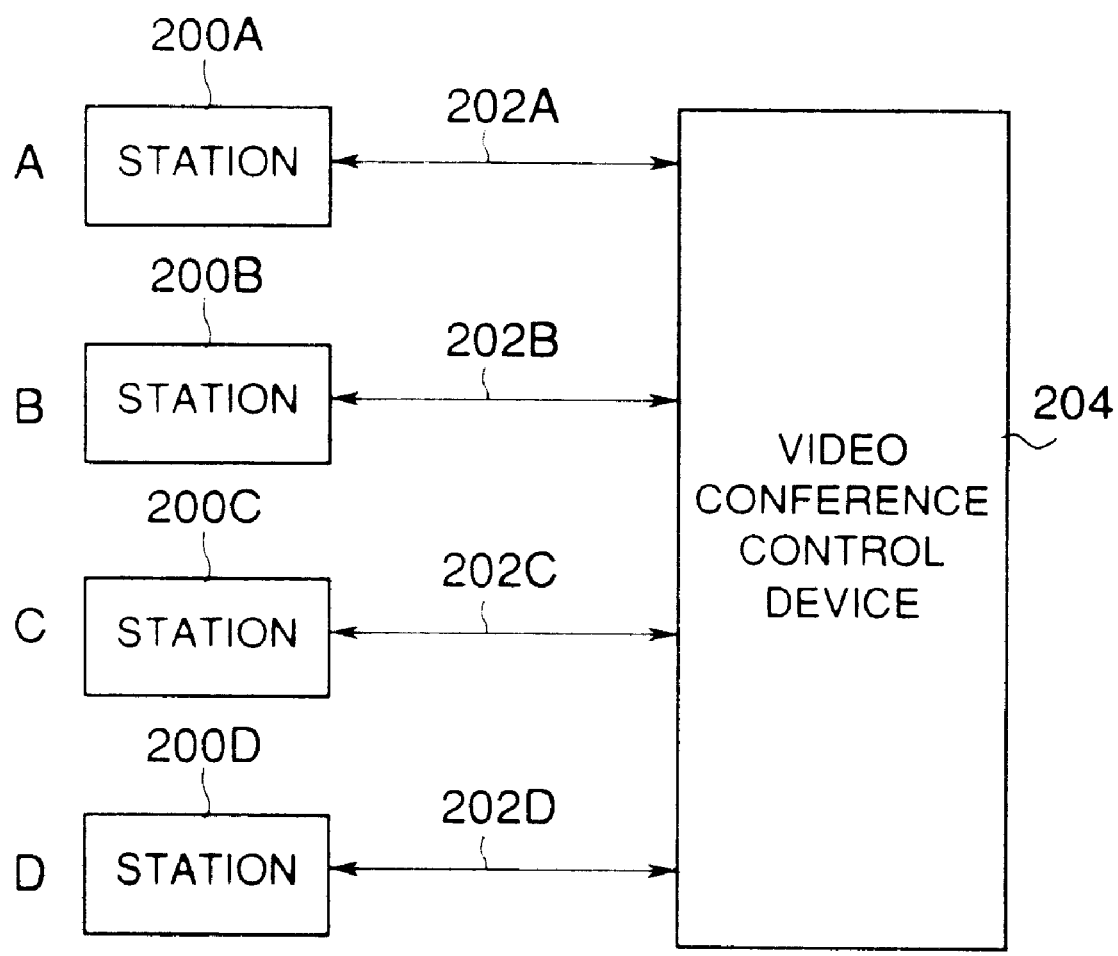
FIG. 13 is a block diagram showing the arrangement of a four-station video conference system according to the eighth embodiment of the present invention.

A sub-picture 17 is fitted in an image of a FIG. 13 displayed on a TV monitor 12. A camera operation unit 8 supplies the following signals to the communication control unit 7 on the basis of operations performed by participants in a conference in the self-station: a panning operation signal S for operating the panning position of the TV camera 2 in the distant place, a conference participant set signal N for setting the number of attendants 1 at a conference, a preset command signal P for presetting panning positions corresponding to the individual attendants 1 in the remote place, and a participant select signal SEL for selecting a panning position corresponding to a given one of the attendants 1 at the conference in the remote place.

The communication control unit 7 supplies, to the memory controller 14, a storage number command signal NS for setting the number of images to be stored and an image write command signal WR for commanding storage of a video signal. The memory controller 14 writes images in a number corresponding to the storage number command signal NS from the communication control unit 7 in the image memory 15 on the basis of the image write command signal WR. The memory controller 14 also controls the image memory 15 to read out these stored images as a video signal by which they are located at predetermined positions. Furthermore, on the basis of a video signal switch signal CH, the memory controller 14 controls a timing at which the output from the picture-in-picture circuit 16 is switched between the video signal from a moving image codec 10 and the video signal from the image memory 15.

The moving image codec 10 outputs a sync signal SY to the memory controller 14 to obtain synchronism between video signals. The communication control unit 4 supplies a panning position control signal SR for setting the panning position of the TV camera 2 to the still image codec 9. A camera control device 5 controls the panning position of the TV camera 2 in accordance with this panning position control signal SR.

Operations of the above arrangement will be described below with reference to display images shown in FIGS. 3A and 3B and preset states shown in FIGS. 4A to 4D.

In a normal state, an image of a given one of the attendants 1 at the conference in the remote place obtained by the TV camera 2 in the remote place is coded by a moving image codec 3 and supplied from the communication control unit 4 to the local line 6. The coded video signal received by the communication control unit 7 from the local line 6 is decoded by the moving image codec 10. The decoded video signal is transferred to the TV monitor 12 via the picture-in-picture circuit 16 and displayed as the FIG. 13.

In order to recognize the faces, the number, and the seated positions of the attendants 1 in the distant place, participants in the conference in the self-station perform panning and zooming of the TV camera 2 by using the camera operation unit 8, or acquire such information through communications using voices. When the number of attendants 1 at the conference is recognized in this manner, the data is input from the camera operation unit 8.

Consequently, the conference participant set signal N is supplied from the camera operation unit 8 to the communication control unit 7, setting the preset number of panning positions of the TV camera 2. On the basis of this preset number, the communication control unit 7 supplies, to the memory controller 14, the storage number command signal NS for setting the number of still images to be stored in the image memory 15. Upon receiving the signal, the memory controller 14 keeps an image storage area corresponding to the set number in the image memory 15.

Subsequently, when an operation is performed from the camera operation unit 8 so as to control the panning position of the TV camera 2, the camera operation unit 8 supplies the panning operation signal S to the communication control unit 7. This panning operation signal S is transmitted from the communication control unit 7 to the communication control unit 4 through the local line 6. On the basis of the panning operation signal S thus transmitted, the communication control unit 4 outputs the panning position control signal SR to the camera control device 5. The camera control device 5 controls the TV camera 2 in accordance with the panning position control signal SR, thereby controlling the panning position of the TV camera 2.

In this first embodiment, the attendants 1 at the conference in the remote place are persons A to D seated side by side from the left to the right. Before the conference is started, the seated positions of the individual persons are registered in an order from the left to the right.

Figure 4A:
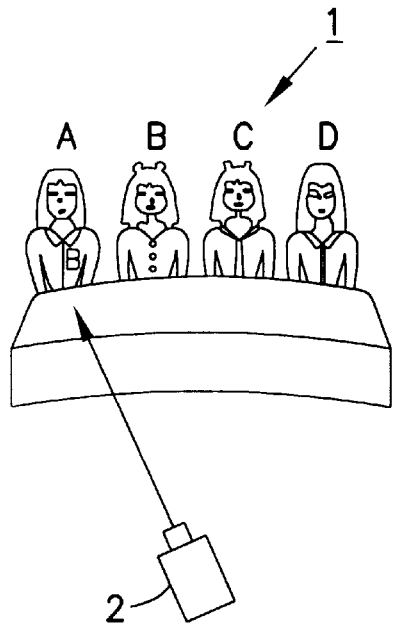
FIGS. 4A to 4D are views for explaining preset of the panning positions of attendants at a conference and preset of images.

In this case, as shown in FIG. 4A, participants in the conference in the self-station operate the camera operation unit 8 in the self-station to aim the TV camera 2 in the direction of the person A while monitoring the panning position of the TV camera 2 on the TV monitor 12, such that the FIG. 13 of the person A is displayed at the center of the display screen of the TV monitor 12.

When the positioning for the person A is finished, the camera operation unit 8 is operated to perform an operation for registering the position. Consequently, the camera operation unit 8 supplies the preset command signal P to the communication control unit 7. Upon receiving the preset command signal P, the communication control unit 7 informs the communication control unit 4 of this reception through the local line 6.

As a result, the communication control unit 4 stores the panning position of the TV camera 2 at that time in the panning position memory 18. The communication control unit 4 also causes the still image codec 9 to code the image of the person A of the attendants 1 at the conference obtained by the TV camera 2 and sends the coded image to the local line 6. The communication control unit 7 causes the still image codec 11 to decode the still image coded signal of the person A received through the local line 6 and sends the decoded signal to the image memory 15.

The communication control unit 7 also outputs the image write command signal WR to the memory controller 14, thereby storing this still image in the image memory 15. As a result, the image memory 15 stores the image of the person A in the first area of the storage areas of four images. The video signal having only the image of the person A is output to the picture-in-picture circuit 16. At the same time, the memory controller 14 supplies, to the picture-in-picture circuit 16, the video signal switch signal CH by which the output image from the image memory 15 is selected only at the timing corresponding to the image area of the person A. Consequently, the TV monitor 12 displays an image formed by fitting the still image of the person A in an area A of the sub-picture 17 superimposed on the FIG. 13 as the moving image of the person A transmitted from the TV camera 2 via the moving image codec 3, the communication control unit 4, the local line 6, the communication control unit 7, and the moving image codec 10.

Figure 4B:
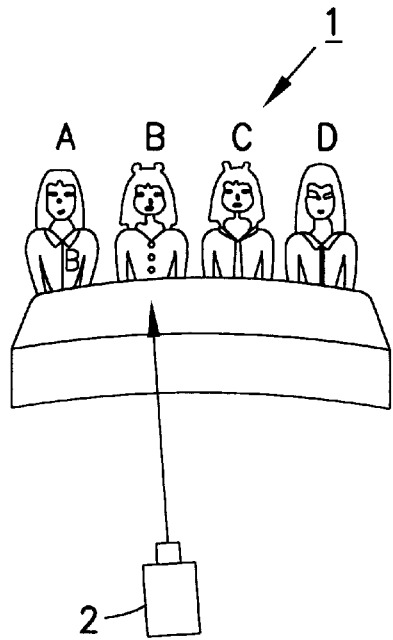

Subsequently, as shown in FIG. 4B, the camera operation unit 8 is manipulated to pan the TV camera 2 in the direction of the person B. When an appropriate panning position is confirmed on the TV monitor 12, the camera operation unit 8 is operated to register the position.

Consequently, the camera operation unit 8 sends the preset command signal P to the communication control unit 7. Upon receiving the preset command signal P, the communication control unit 7 informs the communication control unit 4 of this reception through the local line 6.

The communication control unit 4 stores the panning position of the TV camera 2 at this time in the panning position memory 18. Simultaneously, the communication control unit 4 causes the still image codec 9 to code the image of the person B of the attendants 1 at the conference obtained by the TV camera 2 and sends the coded signal to the local line 6. The communication control unit 7 causes the still image codec 11 to decode the still image coded signal of the person B received through the local line 6 and sends the decoded signal to the image memory 15.

The control communication unit 7 also outputs the image write command signal WR to the memory controller 14, thereby storing this still image in the image memory 15. As a result, the image memory 15 stores the image of the person B in the second area of the storage areas of four images in addition to the image of the person A.

The video signal having the images of the persons A and B is output to the picture-in-picture circuit 16. At the same time, the memory controller 14 outputs, to the picture-in-picture circuit 16, the video signal switch signal CH by which the output image from the image memory 15 is selected only at the timings corresponding to the image areas of the persons A and B. Consequently, the TV monitor 12 displays an image formed by fitting the still image of the person A in the area A and the still image of the person B in an area B of the sub-picture 17 superimposed on the FIG. 13 as the moving image of the person B supplied from the TV camera 2 via the moving image codec 3, the communication control unit 4, the local line 6, the communication control unit 7, and the moving image codec 10.

Figure 4C:
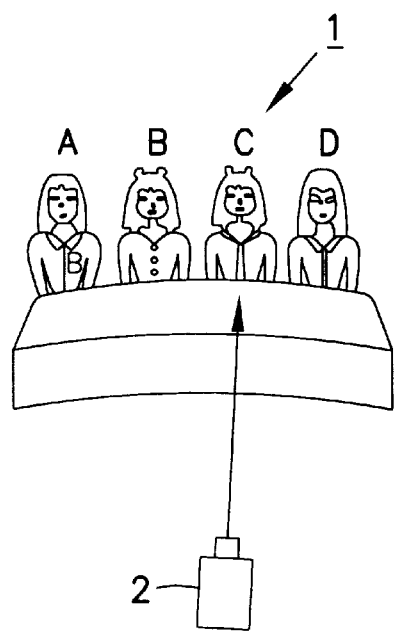
Figure 4D:
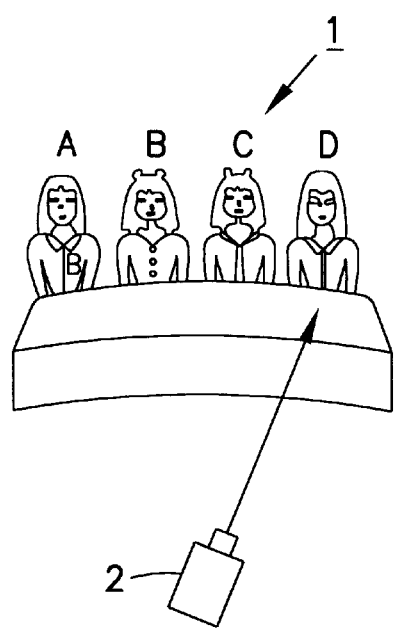

Likewise, as shown in FIGS. 4C and 4D, the above operation is repeatedly performed by setting the panning position of the TV camera 2 in the directions of the persons C and D, thereby storing the images of the persons C and D in the third and fourth areas of the storage areas of four images of the image memory 15, in addition to the images of the persons A and B.

The video signal having the images of the persons A to D is output to the picture-in-picture circuit 16. At the same time, the memory controller 14 outputs, to the picture-in-picture circuit 16, the video signal switch signal CH by which the output image from the image memory 15 is selected at only the timings corresponding to the image areas of the persons A to D. As a result, the TV monitor 12 displays an image formed by fitting the still images of the persons A to D in the areas A to D, respectively, of the sub-picture 17 superimposed on the FIG. 13 as the moving image of the person supplied from the TV camera 2 via the moving image codec 3, the communication control unit 4, the local line 6, the communication control unit 7, and the moving image codec 10.

In the remote place, on the other hand, the panning positions of the TV camera 2 corresponding to the persons A to D are stored in the panning position memory 18.

Through the above operation, the still images of the persons A to D are stored in the image memory 15 and fitted in the areas A to D of the sub-picture 17 superimposed on the original moving image by the picture-in-picture circuit 16. Therefore, as shown in FIG. 3A, even while the TV camera 2 in the distant place is imaging the person B and the image of the person B is being displayed as the FIG. 13 on the TV monitor 12, all the attendants 1 at the conference in the remote place can be monitored constantly in the sub-picture 17.

Since, on the other hand, the order of the persons displayed in the sub-picture 17 corresponds to the order of the attendants 1 in the remote place, the positional relationship between the persons can also be known. In addition, the attendants 1 at the conference in the distant place can be recognized better by the participants in the self-station if the names or symbols corresponding to the individual persons are displayed in addition to the image of the FIG. 13 on the display screen of the TV monitor 12 or in the sub-picture 17. This can be realized easily by using a character generator.

Figure 3A:
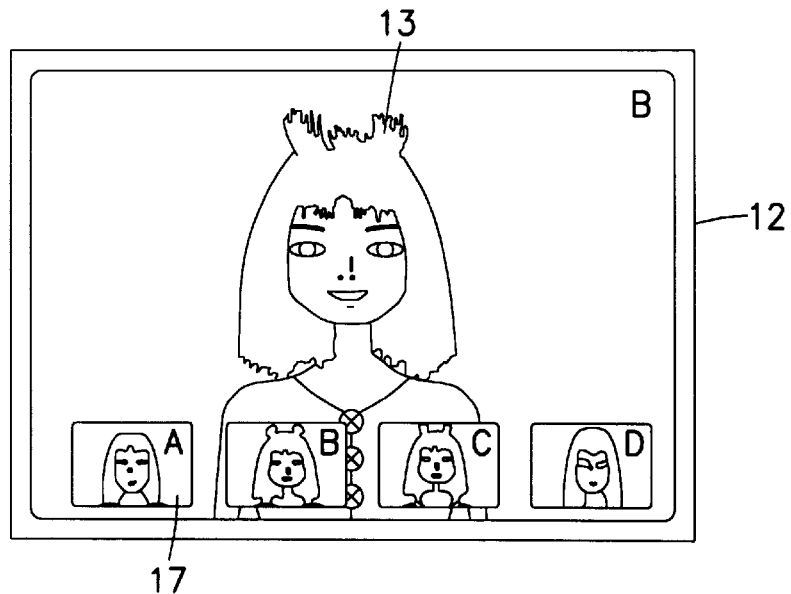
FIGS. 3A and 3B are views for explaining examples of images displayed on a TV monitor according to the first to third embodiments of the present invention.
Figure 3B:
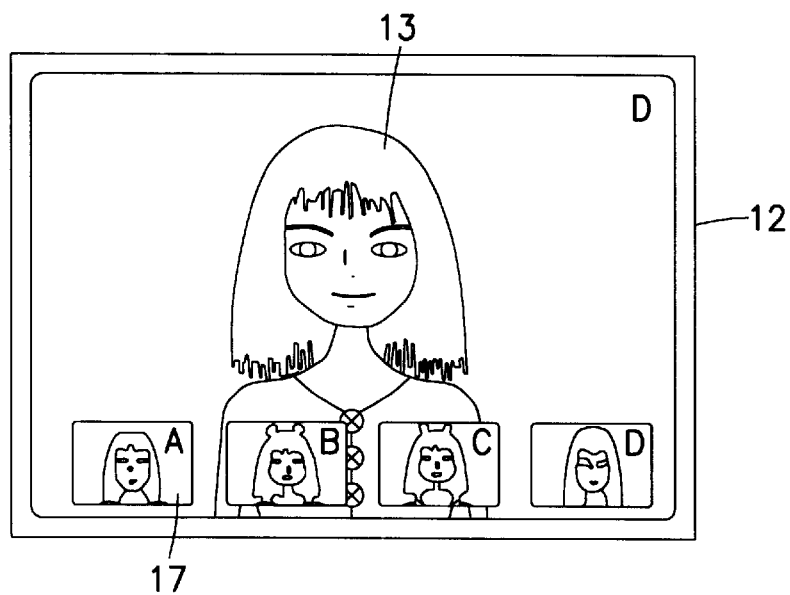

In the state in which the person B is imaged by the TV camera 2 in the remote place and the moving image of the person B is displayed as the FIG. 13, as shown in FIG. 3A, if a given participant in the self-station requests the moving image of the person D while monitoring the sub-picture 17, an operation for selecting the person D is performed by using the camera operation unit 8.

Consequently, the camera operation unit 8 sends the participant select signal SEL to the communication control unit 7, and the signal is supplied to the communication control unit 4 through the local line 6. Upon receiving the signal, the communication control unit 4 reads out the panning position of the TV camera 2 corresponding to the person D from the panning position memory 18 and supplies the readout data to the camera control device 5. As a result, the TV camera is controlled to the panning position for imaging the person D, thereby starting imaging the person D. The image of the person D is transmitted and displayed as the FIG. 13 on the TV monitor 12, as shown in FIG. 3B. At the same time, the name or the symbol to be displayed is switched to that corresponding to the person D.

If the number of attendants 1 is changed during the conference, this new number is reset from the camera operation unit 8, changing the areas of the image memory 15, and performing the preset operation again. In this case, whether the whole procedure is to be performed from scratch or only an addition/delete operation is to be performed can be determined freely by software incorporated in the system.

In addition, the participant select signal SEL output from the camera operation unit 8 may be either an ID signal for selecting one particular person directly or a scan control signal for selecting a person to the right or the left of the FIG. 13 being currently displayed.

In the above embodiment, the display areas of the sub-picture 17 are arranged side by side. However, any given arrangement can be selected provided that the positional relationship between the attendants 1 at the conference in the remote place can be recognized.

2nd Embodiment

Figure 5:
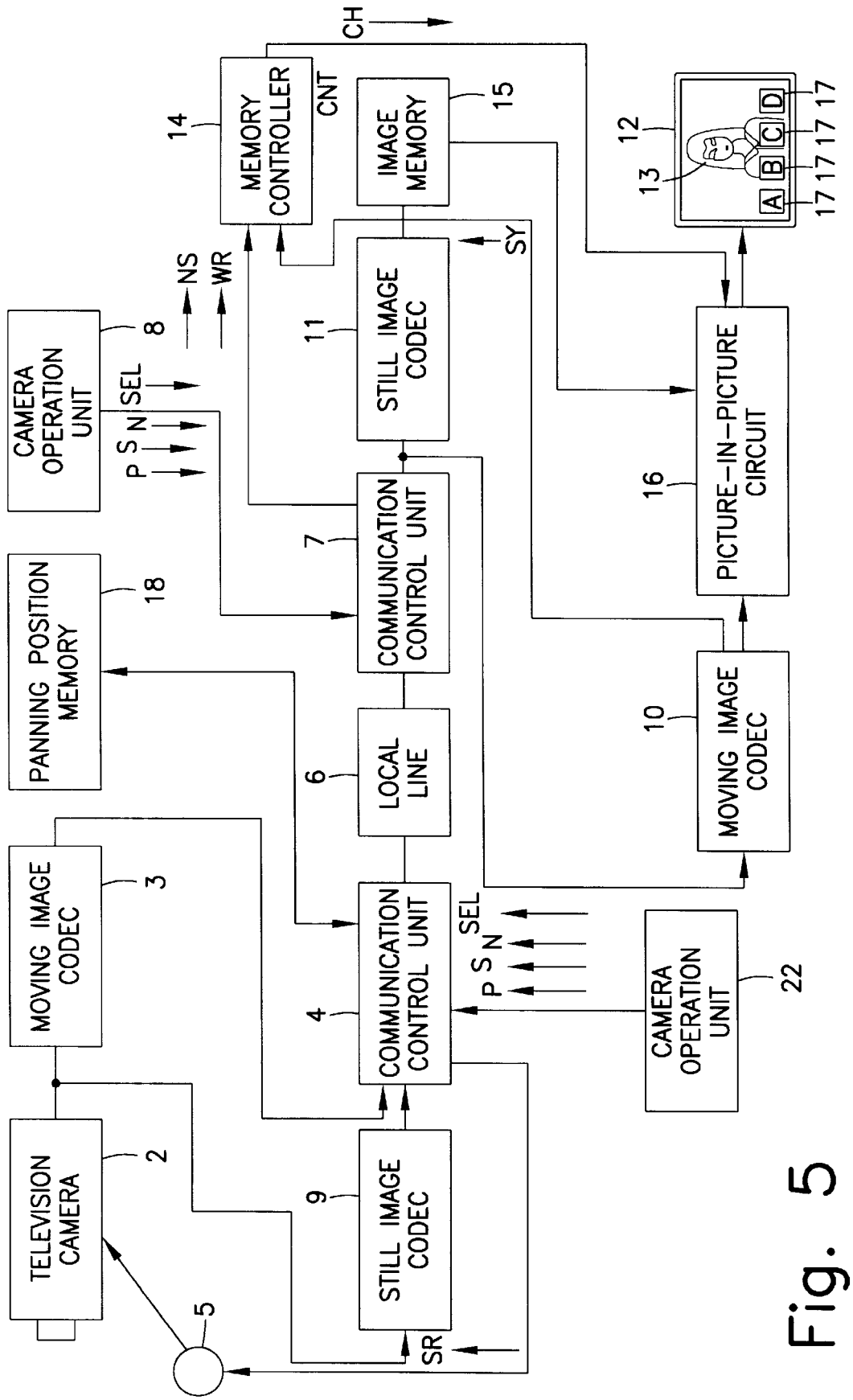
FIG. 5 is a block diagram showing the arrangement of a video conference system according to the second embodiment of the present invention.

FIG. 5 is a block diagram showing the arrangement of a video conference system according to the second embodiment of the present invention. The same reference numerals as in FIG. 2 denote the same parts in FIG. 5, and a detailed description thereof will be omitted. The above first embodiment exemplifies the arrangement in which the panning positions of a TV camera 2 are preset in a self-station. In the video conference system shown in FIG. 5, however, a camera operation unit 22 provided in a distant place allows input of necessary information, such as a conference participant set signal N corresponding to the number of attendants 1 at a conference, a panning operation signal S for panning a TV camera 2 to a preset position, a preset command signal P for presetting the panning position of the TV camera 2, and a participant select signal SEL for controlling the panning position of the TV camera 2 to the preset panning position. These signals are transmitted from a communication control unit 4 to a communication control unit 7 through a local line 6. Therefore, preset of the panning positions of the TV camera 2 or an operation for controlling the panning position of the TV camera 2 after the preset can be performed from either a camera operation unit 8 or the camera operation unit 22. This arrangement can achieve the same effect as in the first embodiment and can also provide an effect that the TV camera 2 can be operated in exactly the same manner in both the remote place and the self-station.

3rd Embodiment

Figure 6:
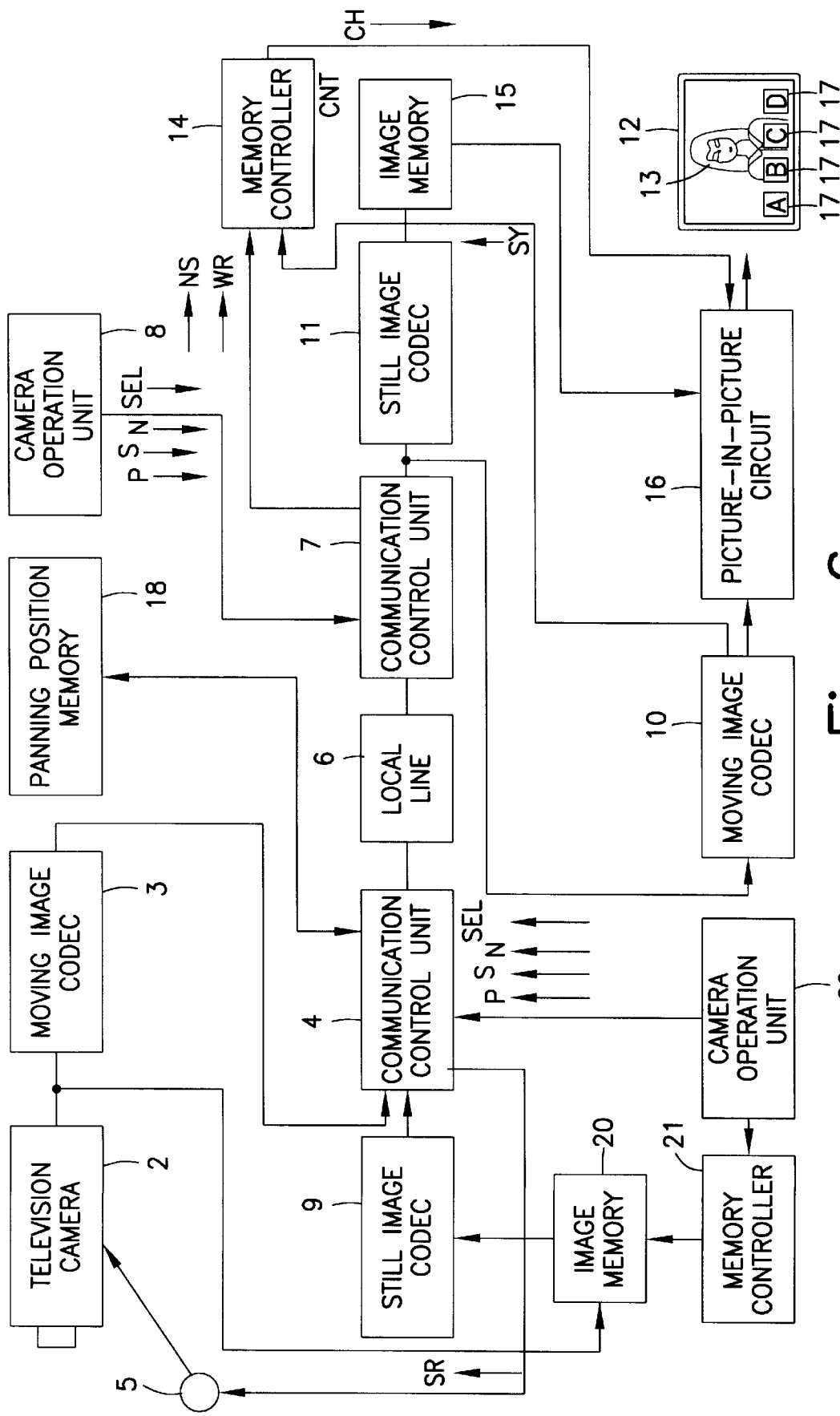
FIG. 6 is a block diagram showing the arrangement of a video conference system according to the third embodiment of the present invention.

FIG. 6 is a block diagram showing the arrangement of a video conference system according to the third embodiment of the present invention. The same reference numerals as in FIG. 5 denote the same parts in FIG. 6, and a detailed description thereof will be omitted. In the video conference system shown in FIG. 6, a camera operation unit 22 provided in a distant place allows input of necessary information, such as a conference participant set signal N corresponding to the number of attendants 1 at a conference, a panning operation signal S for panning a TV camera 2 to a preset position, a preset command signal P for presetting the panning position of the TV camera 2, and a participant select signal SEL for controlling the panning position of the TV camera 2 to the preset panning position. A communication control unit 4 causes a memory controller 21 to control an image memory 20 which receives the output from the TV camera 2 in the remote place, generating an original picture of a sub-picture 17 beforehand in the remote place. This picture is set in an image memory 15 in a self-station via a still image codec 9, the communication control unit 4, a local line 6, a communication control unit 7, and a still image codec 11. This arrangement can achieve the same effect as in the above embodiments and can also provide an effect that the preset operation need only be performed once even if the distant place has a plurality of partner's stations.

4th Embodiment

Figure 7:
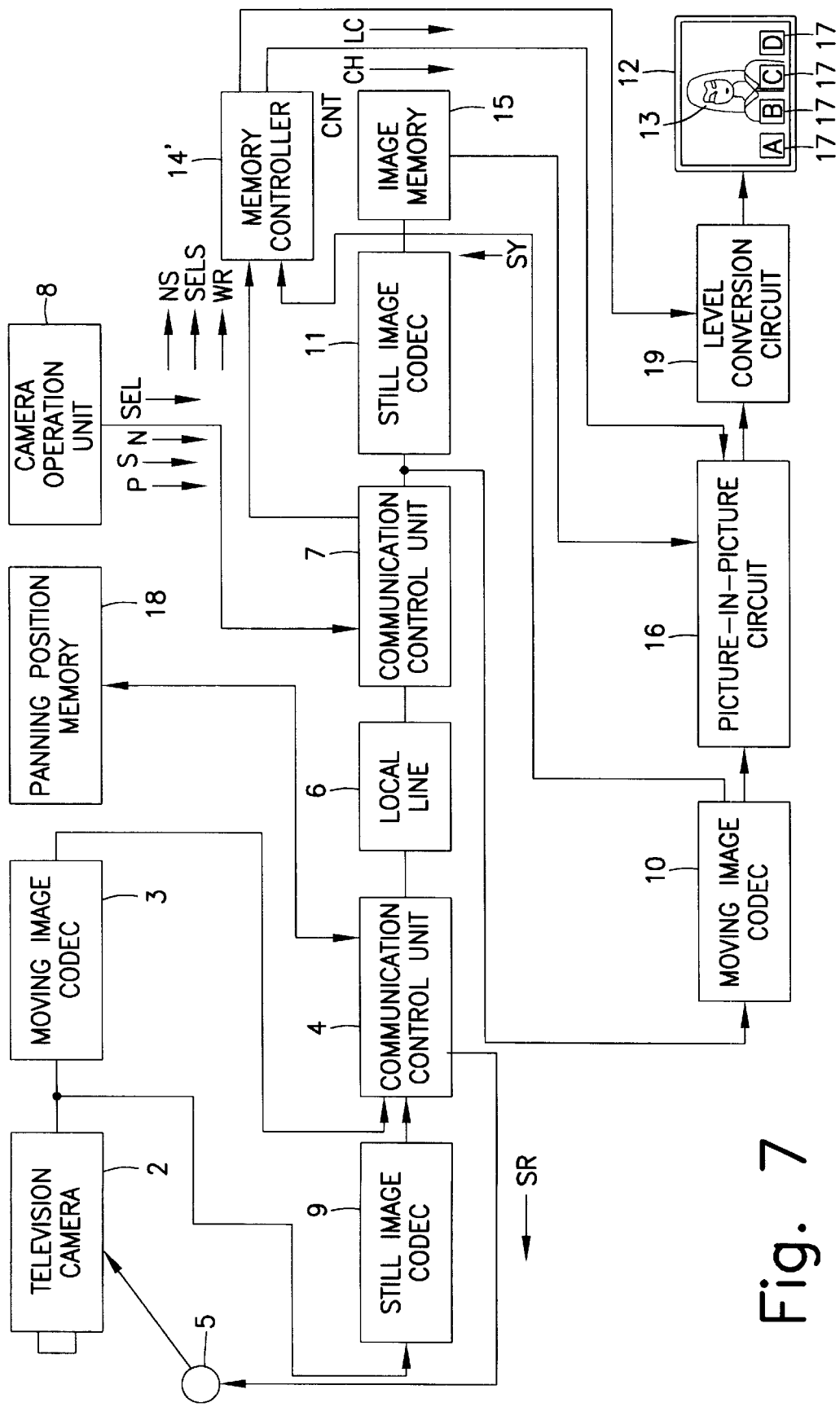
FIG. 7 is a block diagram showing the arrangement of a video conference system according to the fourth embodiment of the present invention.

FIG. 7 is a block diagram showing the arrangement of a video conference system according to the fourth embodiment of the present invention. The same reference numerals as in FIG. 2 denote the same parts in FIG. 7, and a detailed description thereof will be omitted.

Referring to FIG. 7, a level conversion circuit 19 performs level conversion such that the luminance of a particular portion of a video signal supplied from a picture-in-picture circuit 16 to a TV monitor 12 becomes different from those of other portions.

A memory controller 14' writes images in a number corresponding to a storage number command signal NS from a communication control unit 7 into an image memory 15 on the basis of an image write command signal WR, and also controls the image memory 15 such that these stored images are read out as a video signal by which they are arranged at respective predetermined positions. In addition, on the basis of a video signal switch signal CH, the memory controller 14' controls a timing at which the output from the picture-in-picture circuit 16 is switched between a video signal from a moving image codec 10 and the video signal from the image memory 15.

Furthermore, the memory controller 14' supplies, to the level conversion circuit 19, a level conversion control signal LC by which the level of a specific area in a sub-picture 17 of the image from the picture-in-picture circuit 16 becomes different from those of other areas.

Only an operation of this embodiment different from that of the first embodiment will be described below.

The difference of this embodiment from the first embodiment is that an area in the sub-picture 17 corresponding to a person whose moving image is displayed on the TV monitor 12 has a normal luminance level, but the luminance levels of other areas in the sub-picture 17 are set to be lower than the normal luminance level.

That is, a speaking person of participants in a conference can be recognized rapidly by emphasizing the area of the sub-picture 17 corresponding to the person displayed as a moving image on the TV monitor 12.

Figure 8A:
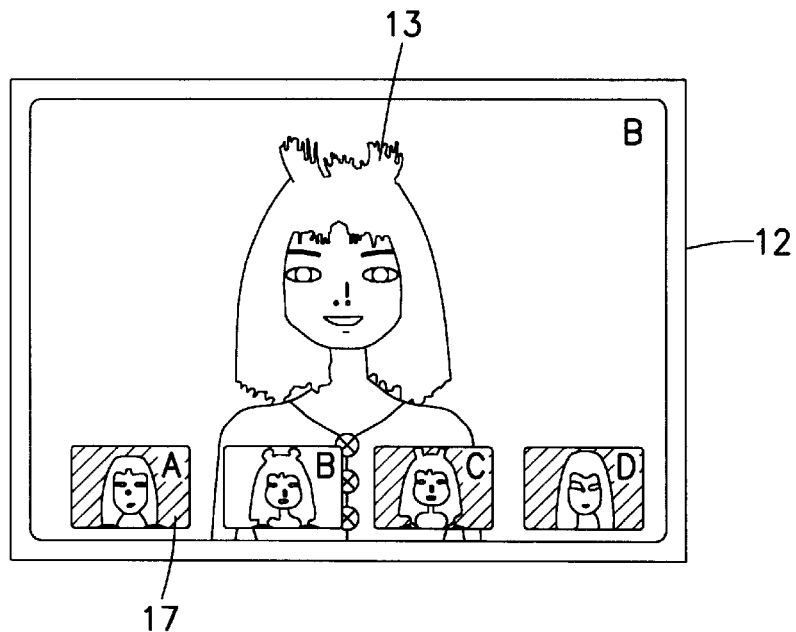
FIGS. 8A and 8B are views showing examples of images displayed on a TV monitor according to the fourth to seventh embodiments of the present invention.

As shown in FIG. 8A, therefore, while a person B is imaged by a TV camera 2 in a remote place and the image of the person B is displayed as a FIG. 13 on the TV monitor 12 as a result of the above preset operation, attendants 1 at the conference in the remote place can be monitored in the sub-picture 17 at any instant. It is also possible to clearly identify the area of the sub-picture 17 corresponding to the FIG. 13 because the area B of the sub-picture 17 is displayed brighter than the other areas.

In the state in which the person B is imaged by the TV camera 2 in the distant place and the moving image of the person B is displayed as the FIG. 13 as shown in FIG. 8A, if participants in a self-station request the moving image of a person D while monitoring the sub-picture 17, an operation for selecting the person D is performed by using a camera operation unit 8.

Consequently, the camera operation unit 8 sends a participant select signal SEL to a communication control unit 7, and this signal is supplied to a communication control unit 4 through a local line 6. Upon receiving the signal, the communication control unit 4 reads out the panning position of the TV camera 2 corresponding to the person D from a panning position memory 18 and supplies the data to a camera control device 5.

Figure 8B:
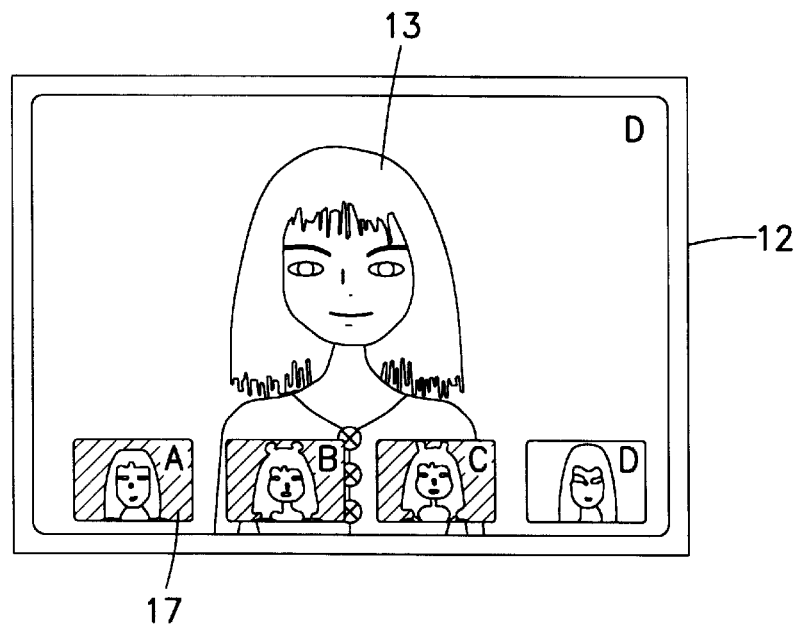

As a result, the TV camera 2 is controlled to the panning position at which the person D is imaged, thereby starting imaging the person D. The image of the person D is transmitted and displayed as the FIG. 13 on the TV monitor 12 as shown in FIG. 8B. Simultaneously, the name or the symbol to be displayed is switched to that corresponding to the person D.

At the same time, the brightness of an area D corresponding to the person D is set to be higher than those of the other areas by the level conversion control signal LC transmitted from the communication control unit 4 to the level conversion circuit 19. Therefore, the person D as the FIG. 13 being currently displayed can be clearly identified as the person corresponding to the area D, making a clear recognition of the positional relationship with the other areas possible.

Note that a particular area of the sub-picture is emphasized by changing the luminance level of that area in this embodiment, but a specific area of the sub-picture can also be emphasized by color, e.g., by displaying the edges of the area in red.

5th Embodiment

Figure 9A:
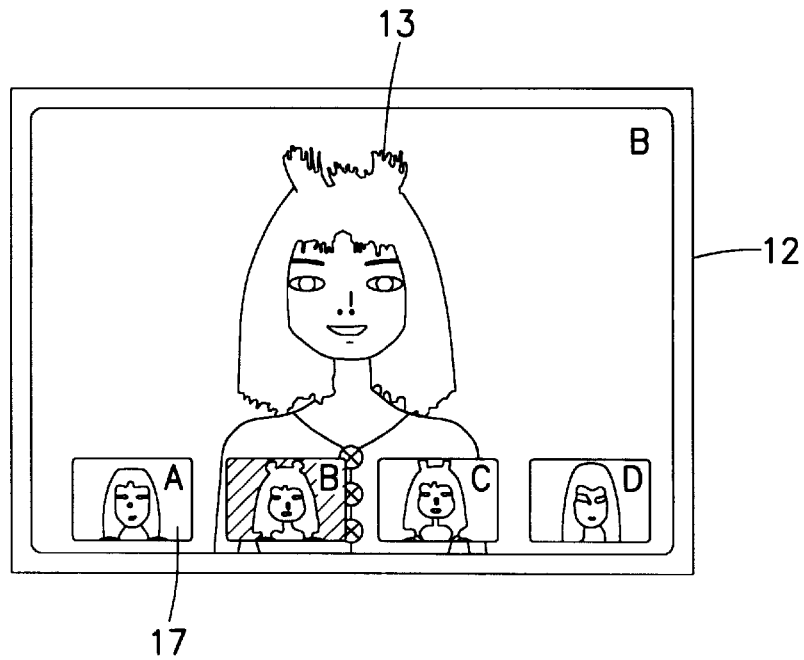
FIGS. 9A and 9B are views showing other examples of images displayed on the TV monitor according to the fourth to seventh embodiments of the present invention.
Figure 9B:
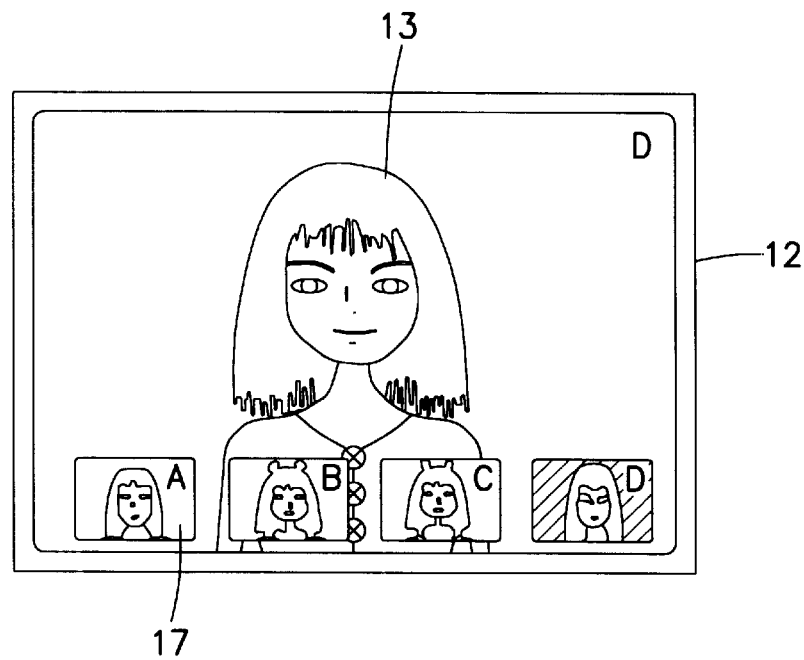

The above fourth embodiment exemplifies the arrangement in which an area of a sub-picture 17 corresponding to a FIG. 13 displayed on a TV monitor 12 is distinguished from other areas by increasing the brightness of that area to be higher than those of the other areas. As shown in FIGS. 9A and 9B, in contrast, the area of the sub-screen 17 corresponding to the FIG. 13 displayed on the TV monitor 12 can be discriminated from other areas by decreasing the brightness of that area to be lower than those of the other areas. This also makes it possible to clearly recognize the positional relationship of the FIG. 13 with the other areas. In addition, the area of the sub-picture 17 corresponding to the FIG. 13 can also be distinguished by the color of that area rather than the brightness. In this case, the same effect as described above can be realized by using a hue conversion circuit in place of a level conversion circuit 19.

6th Embodiment

Figure 10:
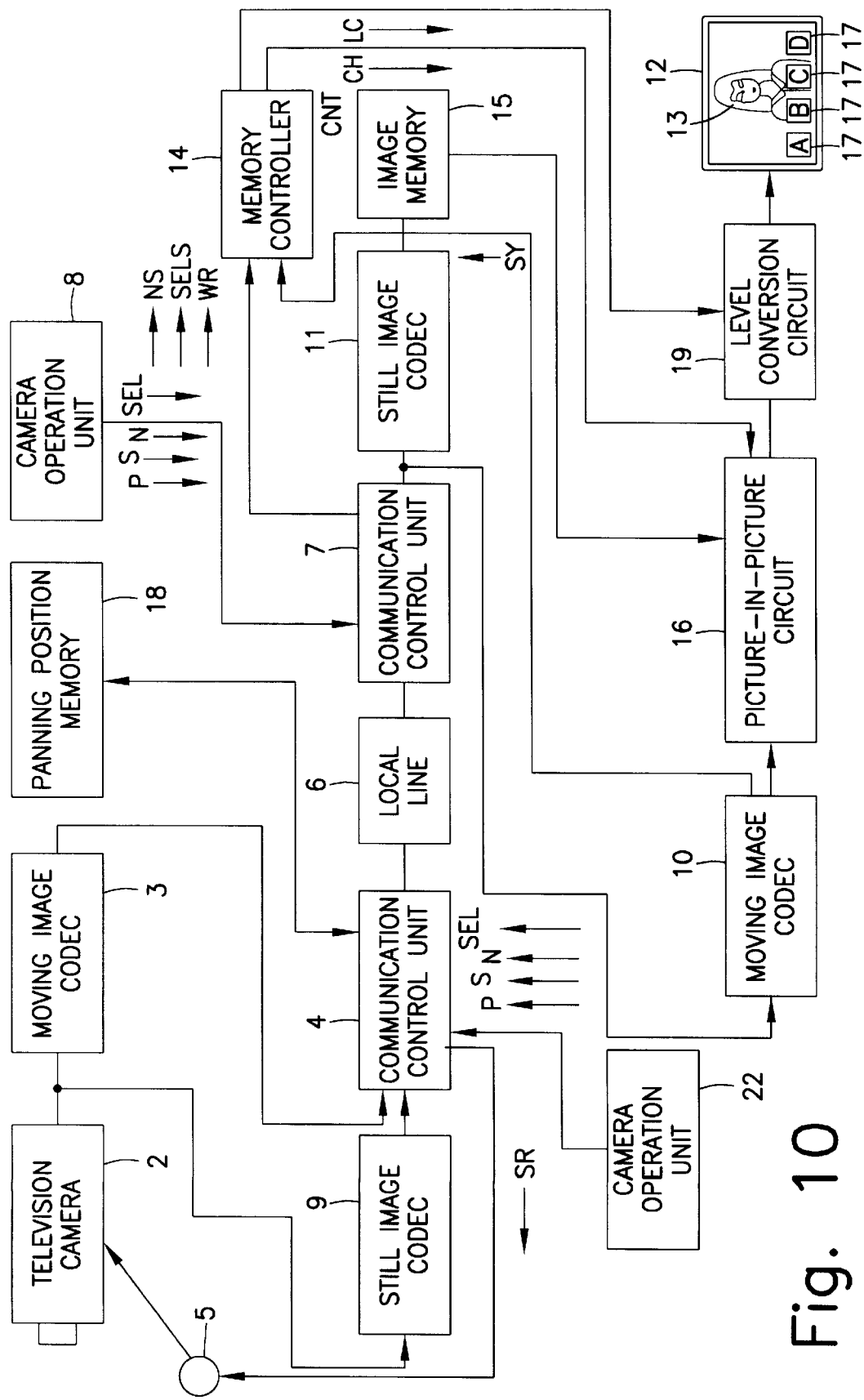
FIG. 10 is a block diagram showing the arrangement of a video conference system according to the sixth embodiment of the present invention.

FIG. 10 is a block diagram showing the arrangement of a video conference system according to the sixth embodiment of the present invention. The same reference numerals as in FIG. 5 or 7 denote the same parts in FIG. 10, and a detailed description thereof will be omitted.

The above fifth embodiment exemplifies the arrangement in which the panning positions of a TV camera 2 are preset in a self-station. In the video conference system shown in FIG. 10, however, a camera operation unit 22 provided in a distant place allows input of necessary information, such as a conference participant set signal N corresponding to the number of attendants 1 at a conference, a panning operation signal S for panning the TV camera 2 to a preset position, a preset command signal P for presetting the panning position of the TV camera 2, and a participant select signal SEL for controlling the panning position of the TV camera 2 to the preset panning position. These signals are transmitted from a communication control unit 4 to a communication control unit 7 through a local line 6. Therefore, preset of the panning positions of the TV camera 2 or an operation for controlling the panning position of the TV camera 2 after the preset can be performed from either a camera operation unit 8 or the camera operation unit 22. This arrangement can achieve the same effect as in the above embodiments and can also provide an effect that the TV camera 2 can be operated in exactly the same manner in both the remote place and the self-station.

7th Embodiment

Figure 11:
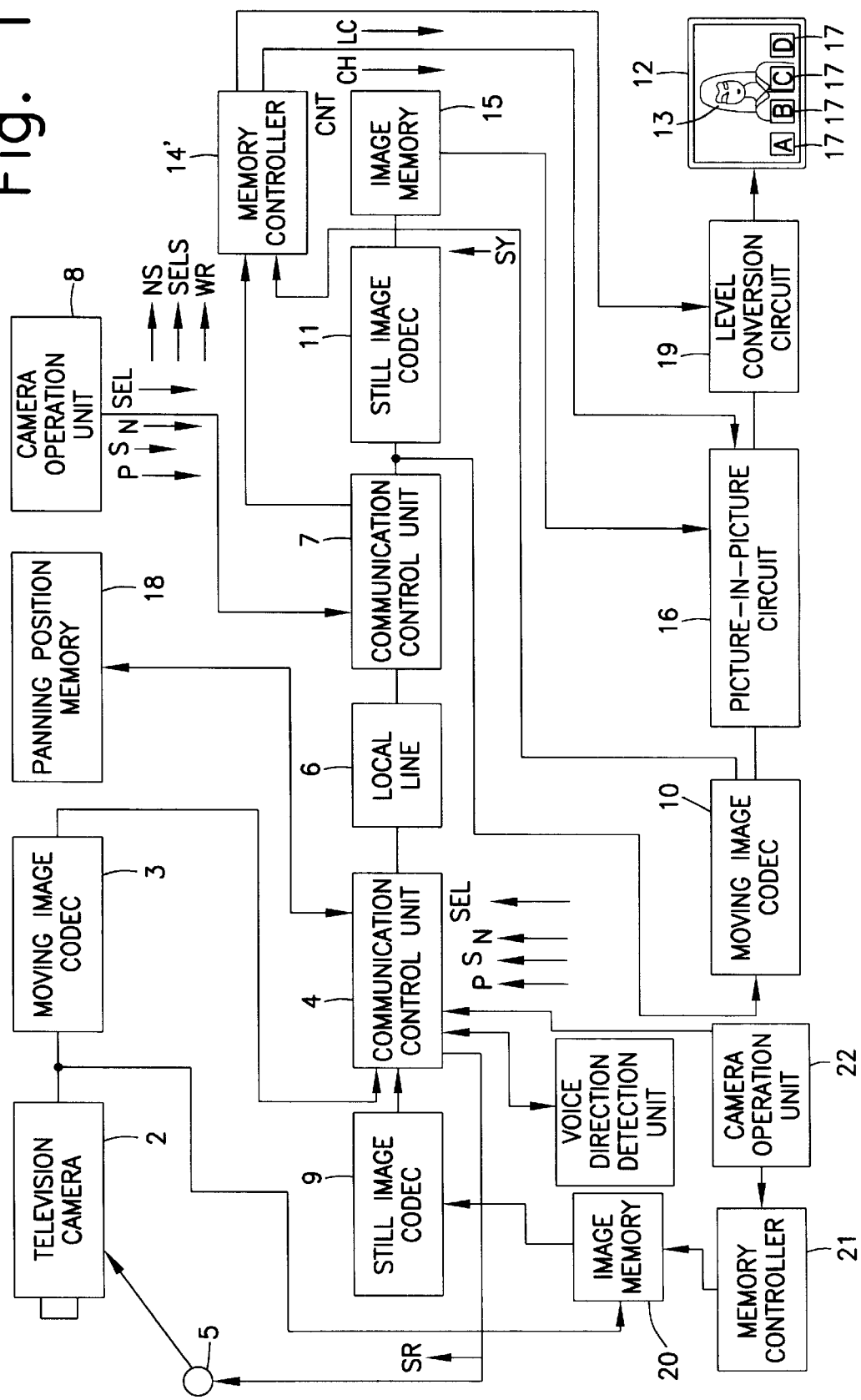
FIG. 11 is a block diagram showing the arrangement of a video conference system according to the seventh embodiment of the present invention.

FIG. 11 is a block diagram showing the arrangement of a video conference system according to the seventh embodiment of the present invention. The same reference numerals as in FIG. 10 denote the same parts in FIG. 11, and a detailed description thereof will be omitted.

In the video conference system shown in FIG. 11, a camera operation unit 22 provided in a distant place allows input of necessary information, such as a conference participant set signal N corresponding to the number of attendants 1 at a conference, a panning operation signal S for panning a TV camera 2 to a preset position, a preset command signal P for presetting the panning position of the TV camera 2, and a participant select signal SEL for controlling the panning position of the TV camera 2 to the preset panning position. A communication control unit 4 causes a memory controller 21 to control an image memory 20 which receives the output from the TV camera 2 in the remote place, generating an original picture of a sub-picture 17 beforehand in the remote place. This picture is set in an image memory 15 in a self-station via a still image codec 9, the communication control unit 4, a local line 6, a communication control unit 7, and a still image codec 11. This arrangement can achieve the same effect as in the above embodiments and can also provide an effect that the preset operation need only be performed once even if the distant place has a plurality of partner's stations.

The system of the seventh embodiment further comprises a voice direction detection unit 30 for detecting a speaking one of participants in a conference.

Although the voice direction detection unit 30 may detect actual voices, performing determination by using input voices from a microphone (not shown) is easier.

With this voice direction detection unit 30, it is possible to change the imaging direction of the TV camera 2 toward a speaking person automatically as well as to change it manually.

Switching between the manual mode and the auto mode is performed by a camera operation unit 8 or the camera operation unit 22.

A mode signal from the camera operation unit 8 or 22 is supplied to the voice direction detection unit 30 via the communication control unit 4. In response to this input signal, the voice direction detection unit 30 detects the direction in which a voice is produced.

The voice direction detection unit 30 sends the detection result to the communication control unit 4, and the communication control unit 4 controls a camera control device 5 on the basis of the panning position information stored in a panning position memory 18 and the voice direction detection result, changing the imaging direction of the TV camera 2. In this case, the panning position information is used in addition to the voice direction detection result to change the imaging direction of the camera in order to image a speaking person more reliably as an object to be imaged.

Note that in each of the above first to seventh embodiments of the present invention, only the arrangement for imaging attendants at a conference is illustrated on the remote place side, and only the arrangement for displaying images is illustrated on the self-station side, for the sake of simplicity in explanation. It is, however, apparent that the self-station has the same arrangement for imaging attendants at a conference as that of the distant place, and the distant place has the same arrangement for displaying images as that of the self-station.

Note also that in each of the above first to seventh embodiments, the video conference system having two stations has been described for the sake of simplicity. In the following embodiment of the present invention, a video conference system for holding a conference between a plurality of stations will be described.

8th Embodiment

Figure 12:
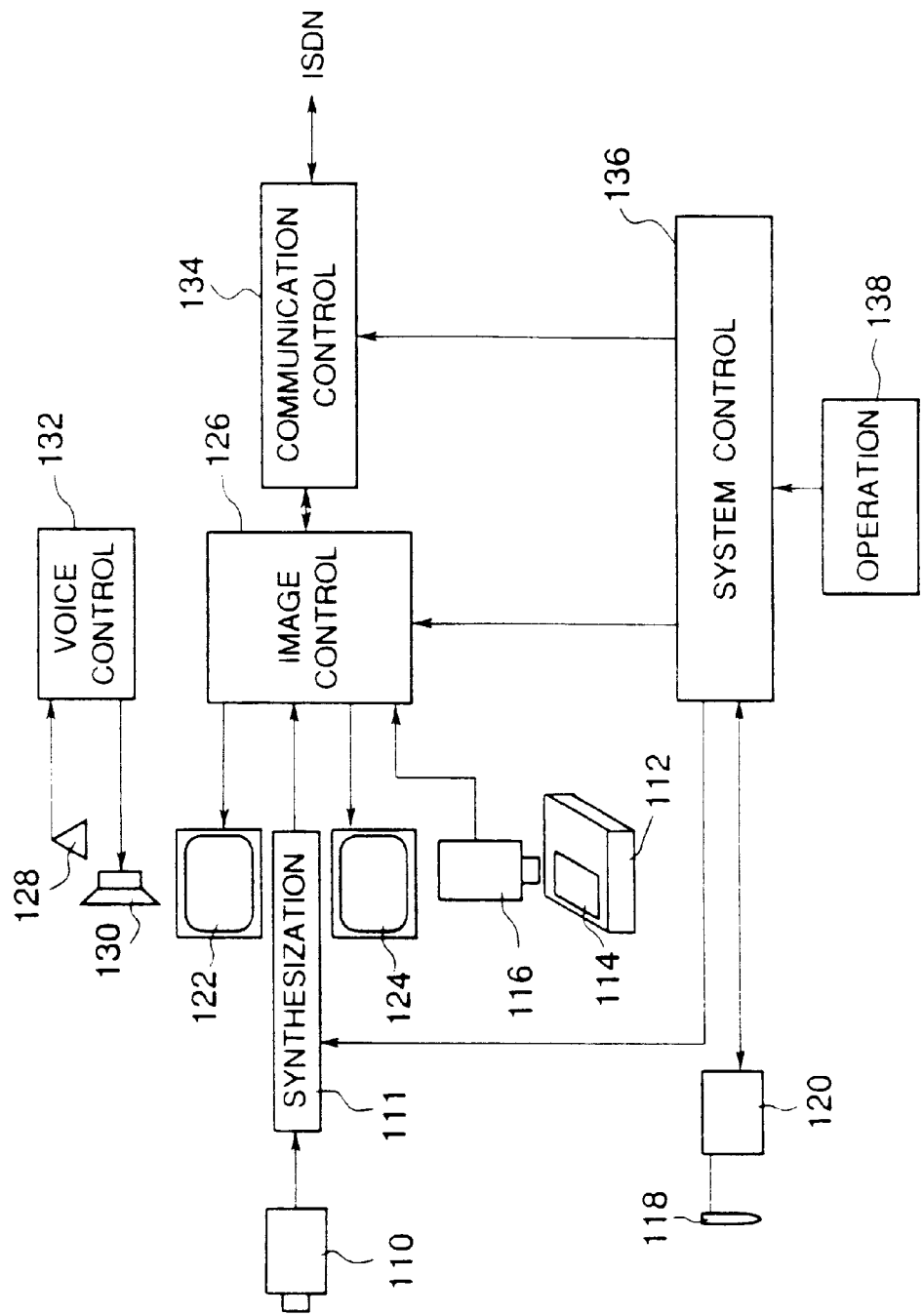
FIG. 12 is a block diagram showing the arrangement of a terminal of a video conference system according to the eighth embodiment of the present invention.

FIG. 12 is a block diagram showing the arrangement of a terminal for a video conference system according to a video conference system of the eighth embodiment of the present invention. Referring to FIG. 12, this video conference system comprises a camera 110 for imaging participants in a conference, a synthesization circuit 111 for superimposing a predetermined pattern on an output image from the camera 110, an original image input camera 116 for inputting an image of an original 114 placed on an original table 112, a plotting image input device 120 for inputting a plotting image formed by an input pen 118, a moving image display monitor 122, a still image display monitor 124, and an image control circuit 126 for selecting and synthesizing an output image from the synthesization circuit 111, an output image from the camera 116, and a received image, and controlling image output to the monitors 122 and 124.

The system further comprises a microphone 128, a loudspeaker 130, and a voice control circuit 132 for controlling an input voice from the microphone 128 and an output voice to the loudspeaker 130.

A communication control circuit 134 controls a connection to a communication line, such as an ISDN line. A system control circuit 136 controls the whole system in accordance with an operation of an operation device 138 and an input plotting image from the plotting image input device 120. More specifically, the system control circuit 136 transfers input plotting image data from the plotting image input device 120 to the image control circuit 126 and, if necessary, to other stations. The image control circuit 126 in each of the self-station and the other stations displays the plotting image on the still image monitor 124. This allows each participant in a conference to perform writing in a given portion of a common material image. It is, of course, also possible to permit only a specific participant in a conference to perform writing.

The system control circuit 136 also controls the synthesization circuit 111 to synthesize a designated character pattern image into the output image from the camera 110. The pattern image synthesized by the synthesization circuit 111 is an image representing characters that indicate colors, such as red, blue, and green.

In this embodiment, a specific color is assigned to a station or a terminal which is allowed to input a plotting image by using the plotting image input device 120, and the output plotting image from the station or the terminal is displayed in that color. At the same time, the synthesization circuit 111 in that particular station superimposes a character pattern indicating the assigned color on an input figure image from the camera 110. This superimposed image is transmitted to other stations and displayed on the monitor of the self-station.

The operation of this embodiment will be described in detail below by taking a video conference held by connecting four terminals as an example. As shown in FIG. 13, terminals 200A, 200B, 200C, and 200D of four stations A, B, C, and D are connected to an inter-multipoint video conference communication control device 204 through digital lines 202A, 202B, 202C, and 202D, respectively. Each of the terminals 200A to 200D has the arrangement shown in FIG. 12. The internal circuits of the terminals 200A, 200B, 200C, and 200D are denoted by the same reference numerals, as shown in FIG. 12, which are added with symbols A, B, C, and D, respectively.

Assume, for example, that the station A transmits a still image of a material to the stations B, C, and D and a conference is held by using this material. The image control circuit 126 performs compression-coding for image information to be transmitted and expansion-decoding for the compressed image information received. This compressing/expanding processing, however, does not relate directly to the operation of this embodiment, and so a detailed description thereof will be omitted.

At the terminal 200A in the station A, a participant in the conference places a material original on an original table 112A and operates an operation device 138A to instruct a system control circuit 136A to perform imaging and transmission of the material original. In accordance with the instruction, the system control circuit 136A controls an image control circuit 126A and a communication control circuit 134A to execute pickup, display, and transmission of a still image. That is, the image control circuit 126A supplies the output image from a camera 116A to a monitor 124A to display the image as a still image, and also supplies this output image to the communication control circuit 134A. The communication control circuit 134A transfers the image information from the image control circuit 126A to the video conference communication control circuit 204 through the digital line 202A.

The video conference communication control circuit 204 transfers the image information from the terminal 200A to the terminals 200B, 200C, and 200D. In the terminals 200B, 200C, and 200D, communication control circuits 134B, 134C, and 134D supply the received image information to image control circuits 126B, 126C, and 126D, respectively. The image control circuits 126B, 126C, and 126D output the received video signal to monitors 124B, 124C, and 124D, respectively, thereby displaying the image as a still image.

As a result, the same still image is displayed on the still image display monitors 124A to 124D of the stations A to D.

Figure 14:
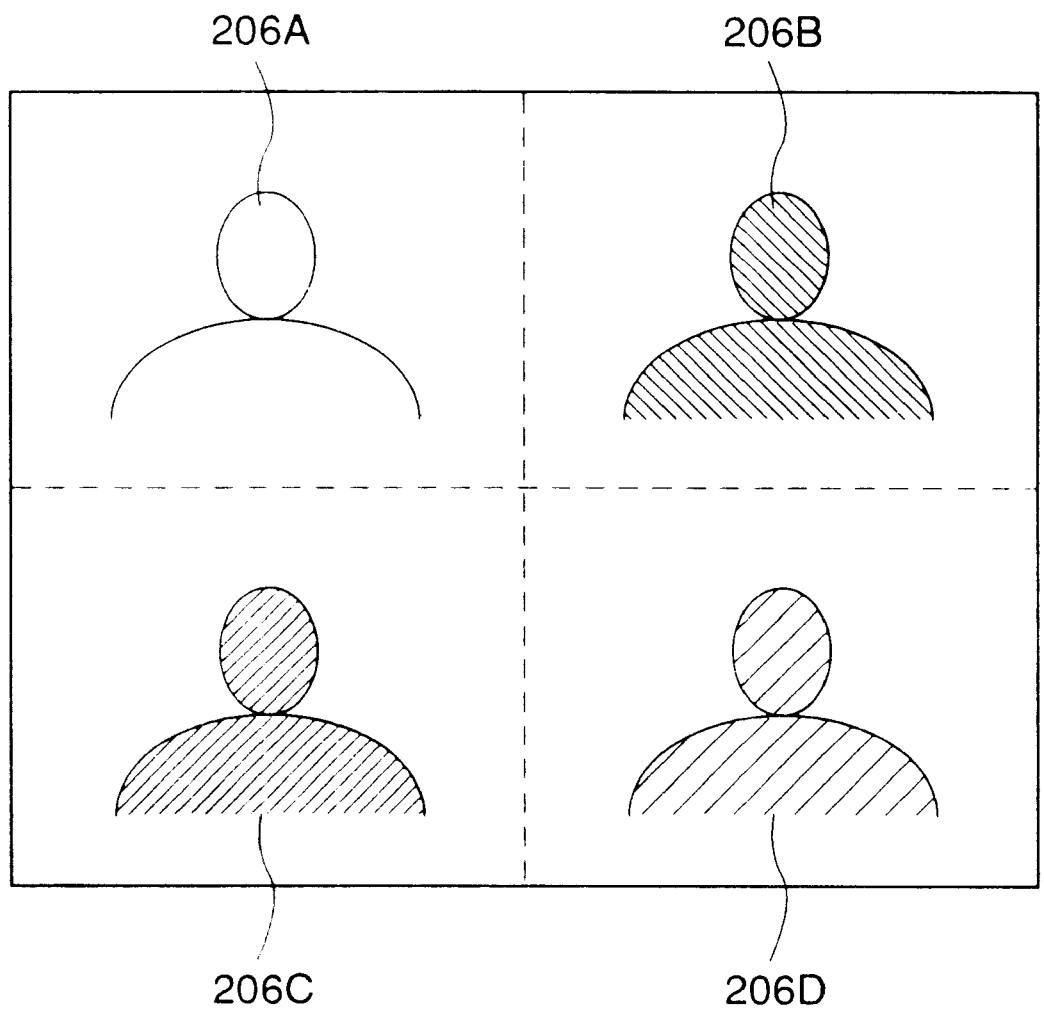
FIG. 14 is a view showing an example of an image displayed on a TV monitor according to the eighth embodiment.

Participants in the conference in the stations A, B, C, and D are imaged by cameras 110A, 110B, 110C, and 110D, respectively, and their figure images are intercommunicated and displayed on moving image display monitors 122A, 122B, 122C, and 122D of the terminals 200A, 200B, 200C, and 200D, respectively, as a four-image multi-picture display, as shown in FIG. 14. Referring to FIG. 14, FIGS. 206A, 206B, 206C, and 206D indicate participants in the conference in the stations A, B, C, and D, respectively.

If a plurality of participants are present in each station, their images can be displayed in accordance with the methods described in the above first to seventh embodiments. In addition, it is apparent that the number of pictures in the multi-picture display is not limited to four but may be varied in accordance with the number of stations.

Suppose the participant in the conference in the station A operates the operation device 138A to cause the system control circuit 136A to designate a plotting image input mode in which plotting image input from a plotting image input device 120A is enabled. In response to this designation, the system control circuit 136A enables the plotting image input device 120A, requesting the plotting image input device 120A to transmit plotting image information (e.g., the color of a pen and the type of a line) currently being set. The plotting image input device 120A transmits the plotting image information to the system control circuit 136A. The system control circuit 136A causes a synthesization circuit 111A to generate a character pattern corresponding to color information of the plotting image information received and to synthesize this color information into the output image from the camera 110A. If, for example, the color information indicates red, the system control circuit 136A causes the synthesization circuit 111A to generate a character image, "RED."

Figure 15:
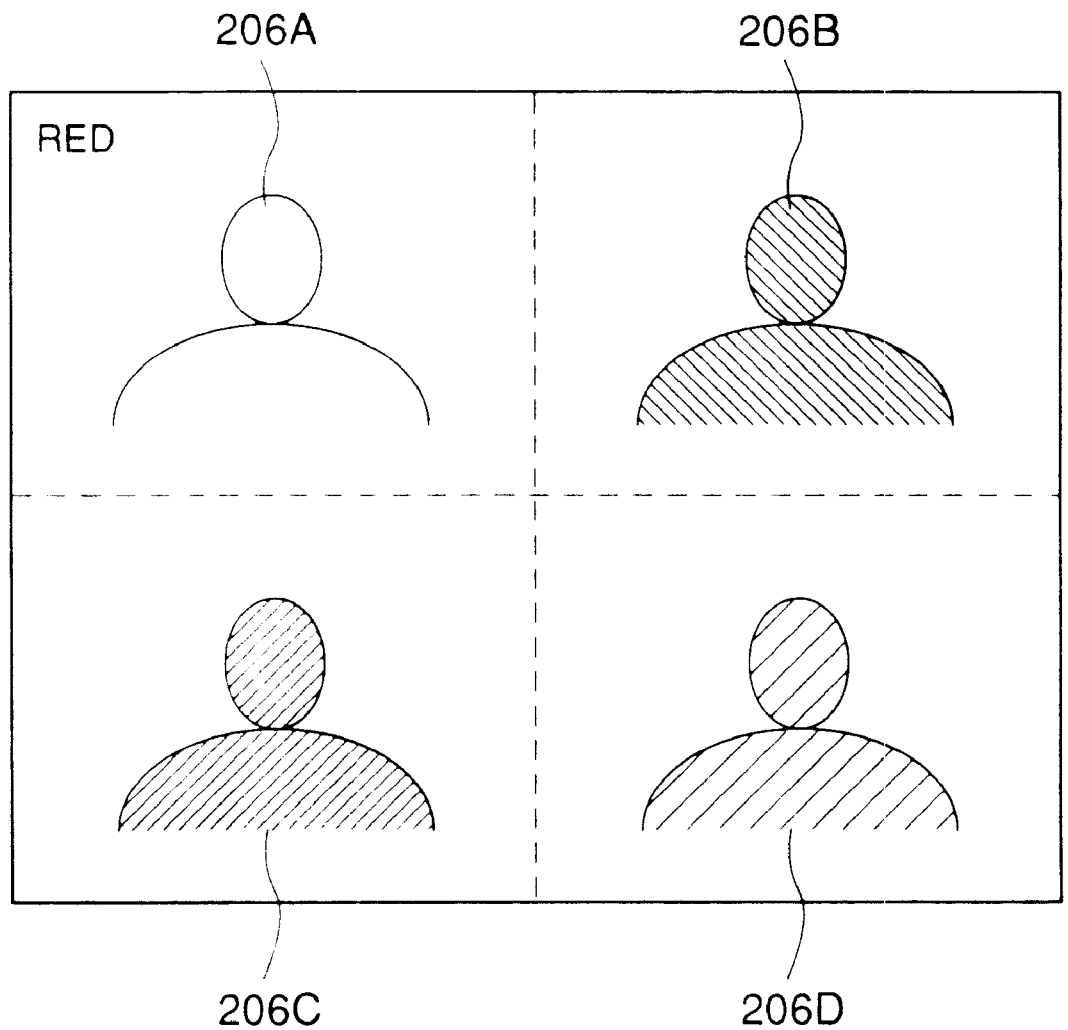
FIG. 15 is a view showing an example of an image displayed on the TV monitor when a station A is set in a plotting image input mode according to the eighth embodiment.

Consequently, as shown FIG. 15, the character image "RED" is superimposed on the FIG. 206A of the attendant in the station A, which is displayed on each of the monitors 122B, 122C, and 122D in the stations B, C, and D, respectively.

When a plotting image is input from the plotting image input device 120A, the system control circuit 136A transfers the plotting image data to the image control circuit 126A. The image control circuit 126A displays the plotting image on the still image of the material displayed on the still image display monitor 124A, and at the same time transfers the plotting image data to the communication control circuit 134A. The communication control circuit 134A transfers the plotting image data to the video conference communication control device 204 through the digital line 202A. The video conference communication control device 204 transfers the plotting image data to the terminals 200B, 200C, and 200D through the digital lines 202B, 202C, and 202D, respectively.

In the terminals 200B, 200C, and 200D, the communication control circuits 134B, 134C, and 134D supply the received plotting image data to the image control circuits 126B, 126C, and 126D, respectively. The image control circuits 126B, 126C, and 126D display the plotting image based on the received plotting image data on the still image of the material displayed on the still image display monitors 124B, 124C, and 124D, respectively.

As a result, the content that the participant in the conference in the station A has written by using the plotting image input device 120A is superimposed on the material images displayed on the still image display monitors 124A, 124B, 124C, and 124D in the stations A, B, C, and D, respectively.

While the participant in the conference in the station A is inputting a plotting image by using the plotting image input device 120A, the system control circuit 136A causes the synthesization circuit 111A to flicker the pattern image currently being synthesized. This consequently flickers the character image "RED" superimposed on the FIG. 206A displayed on each of the moving image monitors 122A, 122B, 122C, and 122D of the stations A, B, C, and D, respectively, shown in FIG. 15. Therefore, the participants in the conference in the stations B, C, and D can recognize that the participant in the station A is inputting a plotting image.

When the participant in the conference in the station A operates the operation device 138A to designate the system control circuit 136A to set a plotting image input disable mode, the system control circuit 136A inhibits the synthesization circuit 111A from synthesizing a pattern. That is, the synthesization circuit 111A directly outputs the output from the camera 110A. As a result, the content displayed on each of the moving image display monitors 122A, 122B, 122C, and 122D of the individual stations returns from that shown in FIG. 15 to that shown in FIG. 14.

In the above embodiment, the synthesization circuit 111 is operated when the plotting image input mode is set. However, the synthesization circuit 111 can also be operated when input of a plotting image is started. In addition, the image synthesized into the output image from the camera 110 by the synthesization circuit 111 may be a character pattern image "PLOTTING" or "WRITING" generated in the corresponding color.

If the plotting image input mode is set in a plurality of stations, the same color may be designated by these stations in some cases. In such a case, color adjustment must be performed to set different colors between the stations. As an example, priority is given to color designation performed by a terminal that has set the plotting image input mode earlier, and a terminal which is going to set the plotting image input mode later checks colors used in other stations. If the same color is already used by another station, a participant in the conference in the self-station is prompted or forced to use another color different from the color already used. A pattern image in the selected color is synthesized by the synthesization circuit 111 in that station.

As can be readily understood from the above description, according to the eighth embodiment of the present invention, a participant inputting a plotting image can be clearly known even if three or more persons are taking part in a conference. This greatly improves the utility of the system.

The present invention can be carried out in various other forms without departing from the spirit and the scope of the present invention.

For example, it is obvious that the eighth embodiment is applicable to the first to seventh embodiments, and, conversely, the first to seventh embodiments can be applied to the eighth embodiment.

One practical example is that although the screen of the monitor in the eighth embodiment is divided into portions corresponding to the number of stations taking part in a video conference as described above with reference to FIG. 14, participants in individual stations can be displayed as shown in FIGS. 3A and 3B, FIGS. 8A and 8B or FIGS. 9A and 9B.

In addition, when the eighth embodiment is applied to the first to seventh embodiments to hold a video conference between a plurality of stations, a station select switch for designating a station to be selected need only be provided in the camera operation unit 8 so that only a station designated by the station select switch can be controlled.

In other words, the foregoing description of embodiments has been given for illustrative purposes only and not to be construed as imposing any limitation in every respect.

The scope of the invention is, therefore, to be determined solely by the following claims and not limited by the text of the specifications and alterations made within a scope equivalent to the scope of the claims fall within the true spirit and scope of the invention.

What is claimed is:

1. A video conference system comprising;
   a) a video camera for imaging participants in a conference;
   b) plotting image input means;
   c) determining means for determining a participant in a conference inputting a plotting image by using said plotting image input means; and
   d) synthesizing means for synthesizing a predetermined image, which indicates input of the plotting image, into image data obtained by said video camera and representing the participant in a conference performing the plotting image input, on the basis of the determination result of said determining means.

2. A system according to claim 1, further comprising display means for displaying the image data synthesized by said synthesizing means.

3. A system according to claim 2, wherein said synthesizing means performs synthesization such that while the plotting image input is being performed by said plotting image input means, the predetermined image data is turned flickered on said display means.

4. A system according to claim 3, further comprising transmitting means for transmitting the image data synthesized by said synthesizing means.

5. A video conference system comprising:
   a video camera for picking up participants to be imaged in a conference;
   registering means for registering a plurality of position information indicating directions of positions of the participants in the conference;
   memory means for storing a plurality of image data corresponding respectively to said plurality of position information registered by said registering means, said plurality of image data being picked up by said video camera:
   synthesizing means for synthesizing the image data read out from said memory means on image data currently being picked up by said video camera with a predetermined relation corresponding to the respective position information registered in said registering means:
   plotting image input means; and
   determining means for determining a participant in a conference inputting a plotting image by using said plotting image input means,
   wherein said synthesizing means synthesizes a predetermined image, which indicates input of the plotting image, into image data obtained by said video camera and representing the participant in a conference performing the plotting image input, on the basis of the determination result of said determining means.

* * * * *